Jan. 21, 1941. A. L. RAVEN 2,229,472
PROJECTION SCREEN STAND
Filed April 16, 1937  3 Sheets-Sheet 2
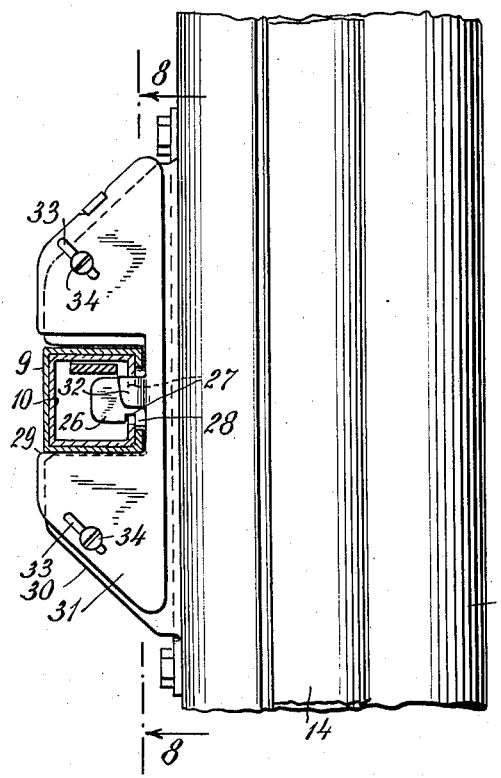
Fig. 7,
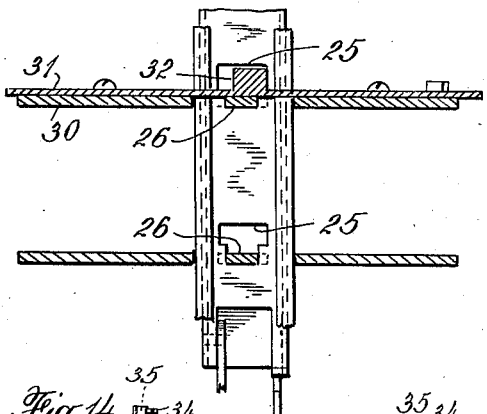
Fig. 8,
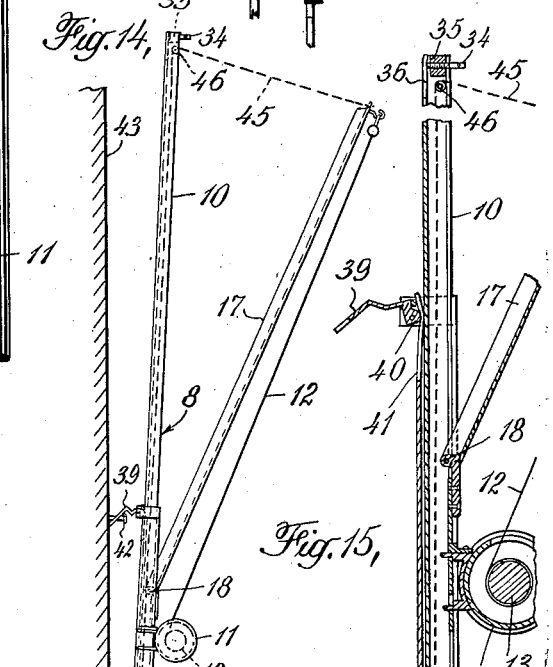
Fig. 14, Fig. 15,
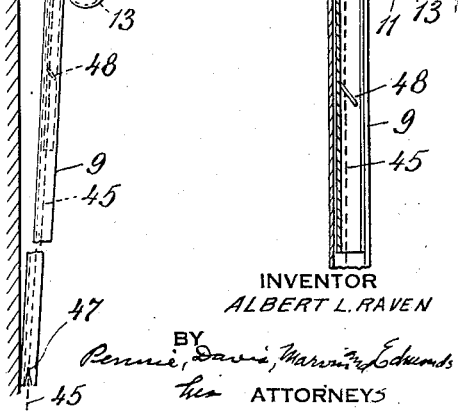
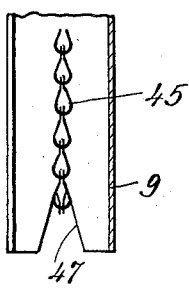
Fig. 16,
INVENTOR
ALBERT L. RAVEN
BY
ATTORNEYS

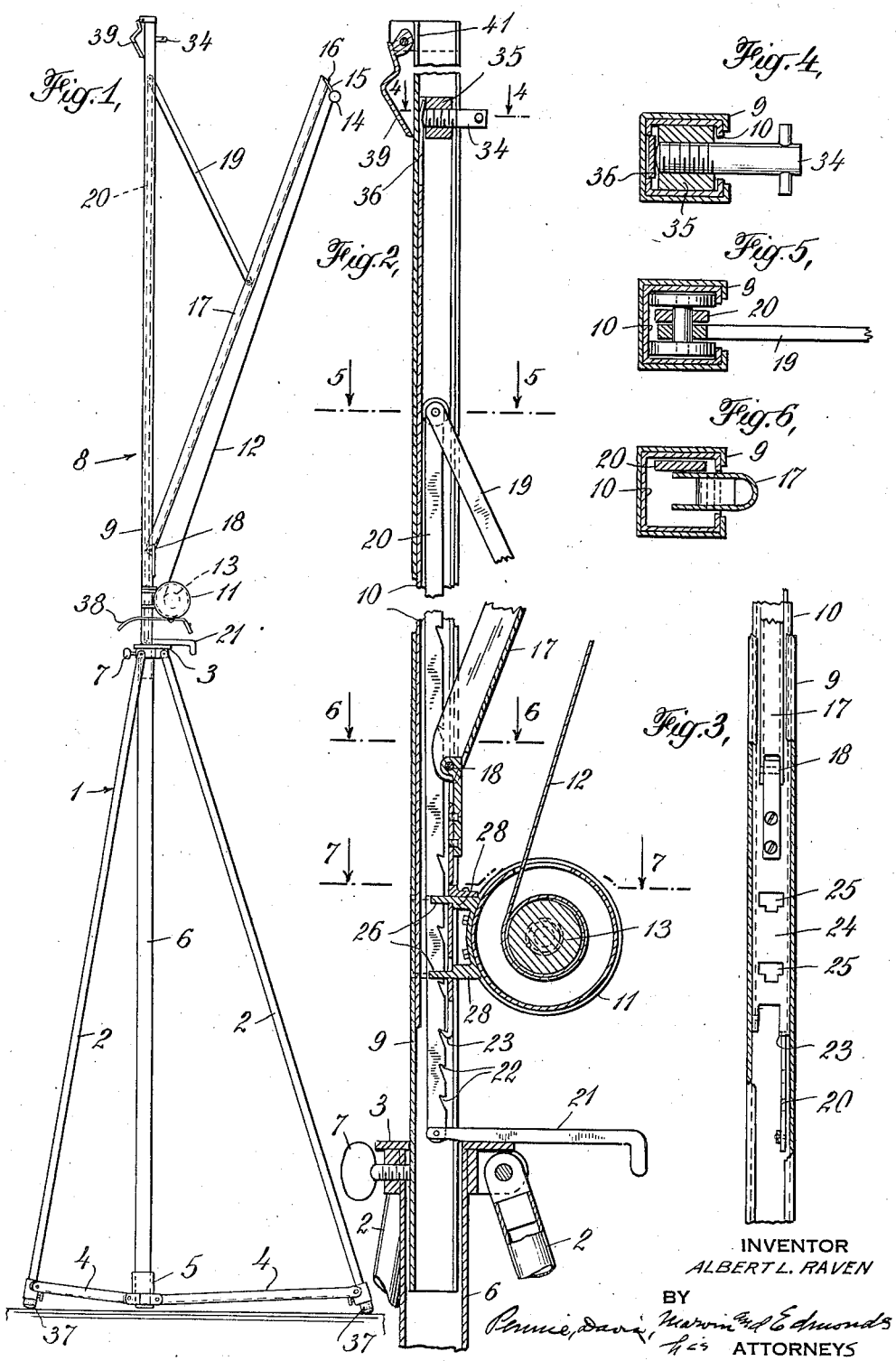

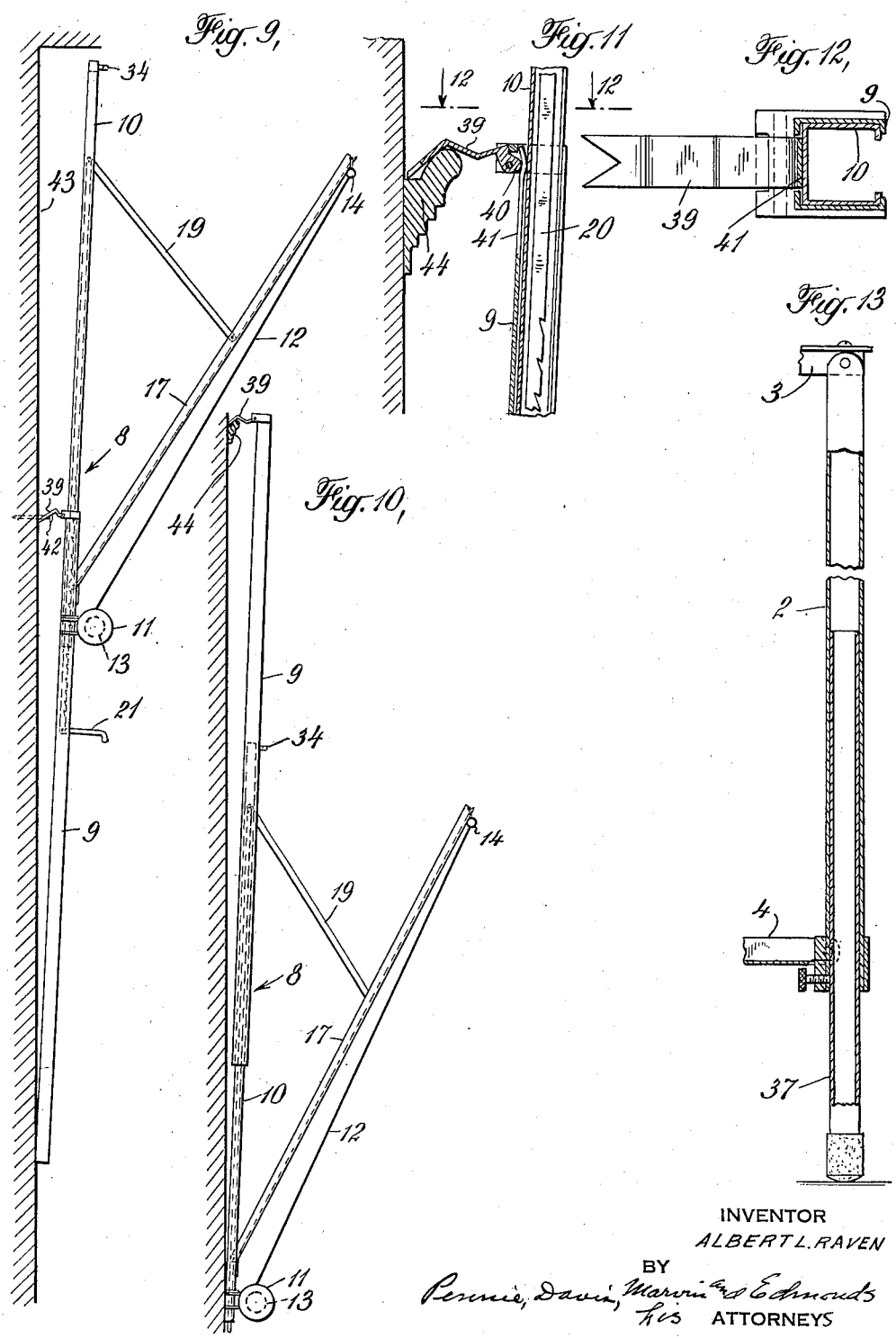

Patented Jan. 21, 1941

2,229,472

UNITED STATES PATENT OFFICE 2,229,472

PROJECTION SCREEN STAND

Albert L. Raven, Mount Vernon, N. Y.

Application April 16, 1937, Serial No. 137,338

8 Claims. (Cl. 88—24)

This invention relates to portable stands for supporting portable projection screens in proper position for showing pictures projected thereon. When projection screens are used to illustrate lectures given before relatively small groups of people, as, for example, in the class-room, or before commercial or industrial groups, such as a sales force gathered together to receive information and instructions, the audience is usually seated on a level floor, and the projection screen is placed at an elevation above their heads. The projector is usually placed on a table toward the rear of the room, and consequently is on the same level as the audience and has to be tilted upward in order to frame the picture upon the screen.

If the projection screen is supported in a vertical plane, as is the case when it is merely hung on the wall, or if one of the ordinary types of screen supports now on the market for exhibiting home movies is used, the lower part of the screen is nearer to the audience and to the projector than the upper part. This produces distortion of the picture, or what is called the "keystone" effect. In order to avoid this undesirable effect, it is necessary to tilt the screen forward so as to place the plane of the screen at right angles to the axis of projection.

Further, where the projector is arranged beneath a lecture bench or desk, and the light is projected through an aperture in the top of the bench, as in the case of the "Spencer Delineascope," it is necessary that the screen be tilted to a considerable angle with respect to the vertical. In such projection systems, the lantern slide or film is arranged in the path of the light projecting vertically through the aperture in the lecture desk, and the lecturer, by using a pencil, may point out the various parts of the projected picture without leaving his seat, the shadow of the pencil being projected onto the screen. With such a system, the screen is placed above the lecturer's desk and may have to be tilted as much as 45° from the vertical in order for the class or audience to obtain the proper view of the projected picture.

In order that portable projection screens may be conveniently stored when not in use, it is customary to make them of flexible sheet material and wind them upon a reel or roll, usually of the spring type, and to stretch them by unwinding the screen from the roll against the tension of the spring, when it is desired to use them.

The object of the present invention is to provide a portable stand which is adapted to support the screen roll and to support the unwound portion of the screen in stretched condition and having the plane thereof tilted from the vertical, and particularly to provide a convenient mechanism by means of which the degree of tilting can be instantly adjusted while the picture is thrown upon the screen in order to select the best angle of tilt under the particular circumstances of projection and visibility to the audience of the projected picture.

A further object of the invention is to provide a projection screen stand which is capable of being readily adapted, by shifting the various parts thereof, to support screens in properly tilted position under a wide variety of conditions with respect to space or location available for the screen.

The invention also aims to provide a screen stand which is readily portable because of its light weight, because of its compactness when folded up, and because of the facility with which it can be taken down, or set up ready for use.

The invention will be better understood from the following description when read in connection with the accompanying drawings which illustrate, by way of example, a number of embodiments of my present invention. In these drawings:

Fig. 1 is a view in side elevation of one embodiment of the improved screen stand;

Fig. 2 is a longitudinal central section drawn to an enlarged scale of the upper portion of the screen stand;

Fig. 3 is a view drawn to the same scale as Fig. 2 showing the outer elongated telescoping supporting member in section and the inner member in side view to illustrate certain details of these members;

Figs. 4, 5 and 6 are transverse sections taken on the corresponding section lines of Fig. 2;

Figs. 7 and 8 illustrate the detachable connection between the screen roll casing and the elongated telescoping supporting members, Fig. 7 being a transverse section taken on line 7—7 of Fig. 2, and Fig. 8 being a section taken on line 8—8 of Fig. 7;

Figs. 9 and 10 are views in elevation showing a modified form of screen supporting device which is adapted to be suspended from the wall;

Figs. 11 and 12 are sectional views of details, Fig. 12 being a section taken on line 12—12 of Fig. 11;

Fig. 13 is an enlarged longitudinal section of one of the legs of the stand shown in Fig. 1;

Figs. 14 and 15 are views similar to Figs. 9 and 10 drawn to a smaller scale illustrating a modification of this form of supporting device; and Fig. 16 is a fragmentary longitudinal section taken near the lower end of Fig. 15.

Referring now to these drawings, and first to Fig. 1, my improved screen supporting device, or stand, comprises a supporting stand 1 in the form of a tripod having legs 2 which are hinged to a crown 3 and tied together at the bottom by means of collapsible spreaders 4. These spreaders are hinged at their inner ends to a spider 5 and at their outer ends are hinged to the legs 2. Secured by the crown 3 and extending to the spider 5 there is a socket tube 6. In folding the tripod 1 for transportation, the spider 5 slides up the socket 6, the spreaders 4 drawing the legs 2 together and folding into parallel relation with them. A stop (not shown) is provided on the bottom of socket tube 6 and limiting the downward movement of spider 5 when the tripod is set up.

Adjustably secured within the socket tube 6 by means of a clamping screw 7 is a screen supporting device indicated generally by reference numeral 8. This device comprises an outer elongated tubular supporting member 9 and an inner elongated tubular supporting member 10, the two being telescoped together. These members are formed of rectangular tubes with the central portions of one of their outer walls cut away, as shown in Figs. 4, 5 and 6, throughout most of their length.

A screen casing 11 is mounted on the supporting device 8 just above the crown 3 of the tripod. This casing contains a screen 12 of suitable sheet material and having a front facing of an appropriate character to receive and reflect a picture projected thereon by means of an optical projector, such as a motion picture apparatus.

The screen is wound upon a spring roller 13 and is provided along its upper edge with a rigid stretching bar 14. This bar is provided with an eye 15 which is adapted to be placed over a hook 16 on the upper end of a stretching arm 17 when it is desired to set up the apparatus in order to project a picture upon the screen. Stretching arm 17 is pivoted, as shown at 18 in Figs. 1 and 2, to the front or right hand face of the inner elongated supporting member 10, as shown in detail in Figs. 2 and 3.

The stretching arm 17 is held at the desired angular position with respect to the vertical telescoped members 9 and 10 by means of a link 19 which is pivoted to the stretching arm and to the upper end of a flat adjusting bar 20 which is vertically slidable within the inner elongated tubular member 10. The adjusting bar 20 is arranged to be manually adjusted from its lower end adjacent the screen roll casing 11, and for this purpose is provided with a pivoted handle 21 which extends laterally from within the telescoping members. In order to adjust the surface of the screen 12 to the desired angle of tilt, the handle 21 is grasped, and adjusting bar 20 is raised or lowered until stretching arm 17 has been adjusted to the correct angular position. Then one of the notches 22 provided along the lower portion of adjusting bar 20 is made to engage a hook 23 which is formed on the inner tubular member 10, as shown in Figs. 2 and 3. Should it be desired to raise the screen 12 to a higher elevation, this can be done with one adjustment by loosening hand screw 7 and raising the outer elongated tubular member 9 which raises simultaneously both the screen roll 11 and the stretching arm 17.

The screen roll casing 11 is removably attached to the screen supporting device 8 in order that the parts may be separated to facilitate the provision of a compact package for ease in transporting the screen and support from one place to another. The construction of this detachable clamp is shown in Figs. 2, 3, 7 and 8. The front, or right hand, face 24 of the inner tubular member 10 is provided with two spaced apertures 25 which are narrow at the bottom and wide at the top, as shown in Fig. 3. On casing 11 is a pair of projections 26 which are spaced similarly to the apertures 25. These projections, as shown in Fig. 7, are notched as indicated at 27, so that when the projections are inserted through the wide upper portions of apertures 25 and casing 11 is lowered, the shoulders formed by notches 27 will engage the inner surface of the wall of tubular member 10 adjacent the narrow portions of these apertures. At the same time, shoulders 28 on projections 26 engage the exterior surface of face 24 of the tubular member.

These projections 26 are positioned centrally with respect to a channel 29 formed in a member 30 which is bolted to casing 11. The walls of channel 29 closely fit against the walls of outer elongated tubular member 9. In order to prevent projections 26 from being slid upwardly and released through the wide upper portions of apertures 25, plate 31 is arranged to slide on the upper surface of member 30, this plate being provided at its center with a tongue 32 of sufficient thickness, as shown in Fig. 8 to substantially fill the upper portion of the upper aperture 25 when projections 26 are in position. In order to cause plate 31 to slide in such a way as to move tongue 32 into or out of aperture 25, the plate is provided with a pair of angularly arranged slots 33 which engage the shanks of screws 34 by means of which the plate is held in position on member 30.

In order to clamp the inner tubular member 10 in fixed position within the outer tubular member 9, a hand screw 34 is provided, as shown in Fig. 2, which is threaded into a block 35 secured within the upper end of the inner tubular member 10. The inner end of this screw forces a tongue 36 formed from the rear wall of the tubular member against the rear wall of the outer tubular member 9.

The legs 2 of the tripod are provided with telescoping extensions 37, as illustrated in Fig. 13.

My improved screen stand is easily and quickly set up, and provides a firm support for the picture screen. The adjustment of the stretching arm 17 in a plane at right angles to the plane of the screen enables the screen to be tilted to any desired angle while a picture is thrown upon it, so that the best conditions of exhibition may be obtained quickly. In taking down the screen stand, the screen is rolled up on roller 13 within the casing and the casing is removed from its support. Then the supporting device 8 is removed from the socket 6, the legs of the tripod are closed against the socket and all three parts of the apparatus are placed side by side, they all being of substantially equal length, and are secured together by means of a pair of leather straps, one of which is shown at 38 attached to the screen casing 11.

The modified form of screen supporting device shown in Figs. 9 and 10 consists of the device 8 of Fig. 1 which is provided with a combined friction clamping device and hanger 39. It is sometimes desirable to support a picture screen quite close to the ceiling, and to hang the support upon the wall of the room not only in order to obtain the desired high elevation, but also on account of limited space. Under such circumstances, the inner telescoping tube 10 is extended upwardly on the outer tube 9, as shown in Fig. 9, and a combined hanger and clamping device 39 is swung outwardly to the position shown in Fig. 11. In this position, a cam 40 engages a tongue 41 and forces it against the outer surface of inner tube member 10, thus clamping the tubes with respect to one another to prevent longitudinal movement. Device 39 is then also in position to engage a nail 42, or other convenient support, on the wall 43. The V-shaped end of device 39, as shown in Fig. 12 prevents the device from disengagement with nail 42.

With this arrangement, the angular position of screen 12 is adjusted by manipulating handle 21, as previously described in connection with Fig. 1.

In Fig. 10 the same device is shown in a slightly different position of adjustment to accommodate supporting the screen at a lower elevation, but hanging the screen supporting device from a higher point on the wall of the room, such as the mounting 44. Under these conditions, the reverse arrangement of the tubular members 9 and 10 is effected, that is, the inner member 10 is slid downwardly so as to project from the bottom of the outer member 9. In this case, device 39 no longer serves as a clamp, but still serves as a hanger. The two tubular members are clamped in their adjusted position by means of the hand screws 34.

In Figs. 14 and 15, there has been illustrated a modified form of supporting device which is similar in all respects to that just described in connection with Figs. 9 and 10, except that instead of employing the links 19 and adjusting bar 20 for adjusting the angular tilt of the screen, a chain or cable adjusting device is used. Thus the stretching bar 17 is supported at its upper end by means of a chain 45 which passes over a small pulley 46 at the upper end of the inner tubular supporting member 10. This chain then passes downwardly through the interior of member 10, and is accessible for the purpose of adjusting the tilt of the screen.

When the parts of the supporting device 8 are adjusted so that the outer tubular member 9 projects below the lower end of the inner tubular member 10, the links of the chain are hooked into a V 47 formed in the lower end of one wall of the outer tubular member 9. When, however, the inner tubular member 10 projects below the lower end of the outer tubular member 9, the links of the chain are hooked into a similar V-shaped notch in the lower end of inner tubular member 10. When the supporting device of Figs. 14 and 15 is used with the tripod of Fig. 1, the chain is hooked onto a pin 48 placed on the rear wall of inner tubular member 10 above the crown 3.

By means of the supporting device of my present invention, I have provided an apparatus which is adapted to support a projection screen at any desired angle of tilt in order that pictures may be properly projected thereon and may be easily viewed by audiences of moderate size which are seated on a level floor. The screen supporting device and screen casing, moreover, are arranged to be readily taken down and assembled into a compact package for transportation. Furthermore, the apparatus is capable of manufacture at low cost.

It will be understood that changes can be made in the construction of the projection screen supporting device as illustrated in the drawings without departing from the spirit of the invention, the scope of which is set forth in the appended claims.

I claim:

1. A portable projection screen support comprising a pair of telescoped elongated members, means for securing to said support a screen roll with the axis thereof at right angles to the axis of said members, means for clamping either of said members with respect to the other so that either member can be made to extend upwardly from the other, means on one of said members for hanging the support from a wall projection or the like, a stretching arm pivoted at one end on the other of said members for supporting the free edge of a motion picture screen wound upon the screen roll, the said stretching arm extending in substantially the same direction as the screen, and means for adjusting the angular position of said stretching arm with respect to said support to vary the inclination of the surface of the screen.

2. A portable projection screen support for rolled screens comprising a pair of elongated members telescoped together to adjust the length of the support, means for clamping said members in adjusted position, means for securing a screen roll to said support with the axis thereof at right angles to the axis of said members, a stretching arm pivoted at one end to one of said members and adapted to support the free edge of the screen and maintain the screen in stretched condition, the said stretching arm extending in substantially the same direction as the screen, and means movable within said members and accessible adjacent the screen roll for adjusting the angular position of the stretching arm to vary the inclination of the screen.

3. A portable projection screen support for rolled screens comprising inner and outer tubular channel members telescoped together to adjust the length of said support, means for clamping said members in adjusted position, means for supporting said support in substantially upright position, means for securing a screen roll to the inner tubular member adjacent one end thereof, an elongated stretching arm pivoted at one end adjacent the screen roll and within the channel of the inner member, the free edge of the screen being adapted to be supported by the opposite end of the stretching arm and the stretching arm extending in substantially the same direction as the screen, an adjusting bar slidable longitudinally within said inner member and connected at its upper end by a link with said stretching arm, and means adjacent the lower end of said adjusting bar for holding the same in adjusted position.

4. A portable projection screen support for rolled screens comprising a supporting standard having a substantially vertical socket, an elongated open channel member adapted to be received within said socket, means for clamping the same therein at any desired elevation, means for securing a screen roll upon said screen support with the axis of the roll in horizontal position, a stretching arm pivoted at its lower end between said open channel member the upper end thereof being adapted to support the free edge of the screen in order to maintain the screen in stretched condition, said stretching arm extending in substantially the same direction as the screen and adjustable means within said open channel member for varying the angular relation of said stretching arm with respect to said channel member.

5. A portable projection screen support for rolled screens comprising a pair of elongated members telescoped together to adjust the length of the support, at least one of said members being an open channel member, means for clamping said members in adjusted position, means for securing a screen roll to one of said members with the axis thereof at right angles to the axis of said members, a stretching arm pivoted at one end to said member of the support to which the screen roll is secured and adapted to support the free edge of the screen to maintain the screen in stretched condition, the said stretching arm being pivoted adjacent said screen roll and extending in substantially the same direction as the screen, and means at least in part within said channel member for adjusting the angular position of the stretching arm to vary the inclination of the screen.

6. A portable projection screen support for rolled screens comprising a pair of elongated members telescoped together to adjust the length of the support, at least one of said members being an open channel member, means for clamping said members in adjusted position, means for securing a screen roll to one of said members with the axis thereof at right angles to the axis of said members, a stretching arm pivoted at one end to said member of the support to which the screen roll is secured and adapted to support the free edge of the screen to maintain the screen in stretched condition, the said stretching arm being pivoted adjacent said screen roll and extending in substantially the same direction as the screen, an adjusting bar slidable longitudinally within said channel member, a connection between the upper end of said bar and said stretching arm, and means adjacent the lower end of said adjusting bar for holding the same in adjusted position.

7. A portable projection screen support for rolled screens comprising a pair of elongated members telescoped together to adjust the length of the support, at least one of said members being an open channel member, means for clamping said members in adjusted position, means for securing a screen roll to one of said members with the axis thereof at right angles to the axis of said members, a stretching arm pivoted at one end to said member of the support to which the screen roll is secured and adapted to support the free edge of the screen to maintain the screen in stretched condition, the said stretching arm being pivoted adjacent said screen roll and extending in substantially the same direction as the screen, pulley means adjacent the upper end of the member to which said stretching arm is pivoted, a flexible cable member attached at its upper end to said stretching arm and passing over said pulley means and within said channel member, and means for releasably securing the lower end of said cable member to adjust the angular position of the stretching arm to vary the inclination of the screen.

8. A folding portable projection screen support for rolled screens comprising an elongated open channel member, means for securing a screen roll upon said member with the axis thereof at right angles to the axis of said member, a stretching arm pivoted at its lower end to said member, the upper end of said stretching arm being adapted to support the free edge of the screen in order to maintain the screen in stretched condition, said stretching arm being pivoted adjacent said screen roll and extending in substantially the same direction as the screen, and means for adjusting the angular position of said stretching arm with respect to said channel member to vary the inclination of the surface of the screen, said stretching arm being adapted to be received within said channel member when said support is in folded condition.

ALBERT L. RAVEN.

CERTIFICATE OF CORRECTION.

Patent No. 2,229,472. January 21, 1941.

ALBERT L. RAVEN.

It is hereby certified that error appears in the printed specification of the above numbered patent requiring correction as follows: Page 2, second column, line 43, for "hand screw 34" read --hand screw 44--; page 5, second column, line 73, claim 4, for the word "between" read --within--; and that the said Letters Patent should be read with this correction therein that the same may conform to the record of the case in the Patent Office.

Signed and sealed this 25th day of February, A. D. 1941.

(Seal)

Henry Van Arsdale,
Acting Commissioner of Patents.